United States Patent
Jung et al.

(10) Patent No.: US 8,736,192 B2
(45) Date of Patent: May 27, 2014

(54) APPARATUS AND METHOD FOR DETECTING OPEN-CIRCUITED LIGHT EMITTING DIODE CHANNELS

(75) Inventors: Ilyong Jung, Bucheon (KR); Seunguk Yang, Anyang (KR); Jae-yong Lee, Seongnam (KR); Jinkyum Kim, Incheon (KR)

(73) Assignee: Fairchild Korea Semiconductor Ltd., Bucheon (KR)

( * ) Notice: Subject to any disclaimer, the term of this patent is extended or adjusted under 35 U.S.C. 154(b) by 286 days.

(21) Appl. No.: 13/239,776

(22) Filed: Sep. 22, 2011

(65) Prior Publication Data

US 2012/0248997 A1 Oct. 4, 2012

(30) Foreign Application Priority Data

Mar. 31, 2011 (KR) .................. 10-2011-0029765

(51) Int. Cl.
G05F 1/00 (2006.01)
(52) U.S. Cl.
USPC ........... 315/291; 315/247; 315/307; 315/312; 315/185 S
(58) Field of Classification Search
USPC .............. 315/247, 185 S, 291, 307–326, 224, 315/225, 274
See application file for complete search history.

(56) References Cited

U.S. PATENT DOCUMENTS

| | | | | |
|---|---|---|---|---|
| 7,573,211 B2 * | 8/2009 | Liu | ........................ | 315/307 |
| 7,675,245 B2 * | 3/2010 | Szczeszynski et al. | ........ | 315/291 |
| 8,035,606 B2 * | 10/2011 | Liao et al. | ................. | 345/102 |
| 8,084,960 B2 * | 12/2011 | Kuo et al. | ................. | 315/297 |
| 8,120,283 B2 * | 2/2012 | Tanaka et al. | ............... | 315/307 |
| 8,274,238 B2 * | 9/2012 | Szczeszynski et al. | ........ | 315/247 |
| 8,344,661 B2 * | 1/2013 | Hsu et al. | ................... | 315/307 |
| 8,405,320 B2 * | 3/2013 | Huang et al. | ................. | 315/291 |
| 2009/0315481 A1 | 12/2009 | Zhao | | |

* cited by examiner

*Primary Examiner* — Tuyet Thi Vo
(74) *Attorney, Agent, or Firm* — Okamoto & Benedicto LLP (57) ABSTRACT

An apparatus for driving an LED device having a plurality of LED channels is disclosed. Each LED channel has a plurality of LEDs connected in series. A power converter converts an input voltage into an output voltage and outputs the output voltage to an output terminal that is connected to first terminals of the plurality of LED channels. A plurality of current controllers are connected to second terminals of the plurality of LED channels, respectively. Each current controller controls a current of a corresponding LED channel. A detection controller determines a detection time based on voltages of the second terminals of the plurality of LED channels. A state detector detects the open-circuited states of the plurality of LED channels based on voltages of the second terminals of the plurality of LED channels at the detection time.

20 Claims, 7 Drawing Sheets

APPARATUS AND METHOD FOR DETECTING OPEN-CIRCUITED LIGHT EMITTING DIODE CHANNELS

CROSS-REFERENCE TO RELATED APPLICATION

This application claims priority to and the benefit of Korean Patent Application No. 10-2011-0029765 filed in the Korean Intellectual Property Office on Mar. 31, 2011, the entire contents of which are incorporated herein by reference.

BACKGROUND OF THE INVENTION (a) Field of the Invention

The present invention relates to a driving apparatus and a driving method of a light emitting diode (LED) device.

(b) Description of the Related Art

An LED device supplies a current to LEDs to drive them, and the LEDs emit light having brightness corresponding to the current. The LED device may be used as a light source of a non-emissive type of display device such as a liquid crystal display (LCD) or for lighting. The LED device includes a plurality of LED channels that are connected in parallel to emit light having predetermined brightness. Each LED channel includes a plurality of LEDs connected in series. Further, the LED device includes a power converter for supplying the currents to the plurality of LED channels.

In a case that a plurality of LED channels are used, a connection between two LEDs of a certain LED channel can become open-circuited. If the open-circuited LED channel is not detected, the power converter provides the maximum voltage to a plurality of LED channels, which can increase power consumption and cause a heating problem.

One example of detecting the open-circuited LED channel is a circuit for providing the maximum voltage to a plurality of LED channels and measuring a voltage of a terminal of each LED channel to regard an LED channel with a terminal voltage of 0V as the open-circuited LED channel. However, the maximum voltage is provided for finding the open-circuited LED channel, so it can increase power consumption and cause a heating problem.

SUMMARY OF THE INVENTION

Embodiments of the present invention provide a driving apparatus and a driving method of an LED device having advantages of finding the open-circuited LED channel while reducing power consumption and heating problem.

According to an embodiment of the present invention, an apparatus for driving an LED device having a plurality of LED channels is provided, and each LED channel has a plurality of LEDs connected in series. The apparatus includes: a power converter for converting an input voltage into an output voltage to output the output voltage to an output terminal, the output terminal connected to first terminals of the plurality of LED channels; a plurality of current controllers connected to second terminals of the plurality of LED channels, respectively, each current controller controlling a current of a corresponding LED channel; a detection controller for determining a detection time based on voltages of the second terminals of the plurality of LED channels, wherein open-circuited states of the plurality of LED channels can be detected at the detection time; and a state detector for detecting the open-circuited states of the plurality of LED channels based on voltages of the second terminals of the plurality of LED channels at the detection time.

Each current controller may control before the detection time so that a state detection current flows in the corresponding LED channel, and may control after the detection time so that an operation current flows in the corresponding LED channel.

The state detection current may be smaller than the operation current.

The detection controller may determine, as the detection time, a time at which at least one of voltages of the second terminals of the plurality of LED channels is larger than a first reference voltage.

The state detector may compare each of voltages of the second terminals of the plurality of LED channels with a second reference voltage at the detection time to detect the open-circuited states of the plurality of LED channels.

The second reference voltage may be smaller than the first reference voltage.

The detection controller may include a maximum value detector for detecting a maximum voltage among voltages of the second terminals of the plurality of LED channels, and a comparator for comparing the maximum voltage and the first reference voltage to generate a signal representing the detection time.

The detection controller may include a plurality of comparators corresponding to the plurality of LED channels, each comparator comparing a voltage of the second terminal of a corresponding LED channel with the first reference voltage, and an AND gate for performing an AND operation with output signals of the plurality of comparators as inputs to generate a signal representing the detection time.

The detection controller may determine, as the detection time, a time when a predetermined time elapses from a time at which at least one of voltages of the second terminals of the plurality of LED channels is larger than the first reference voltage.

The state detector may compare each of voltages of the second terminals of the plurality of LED channels with the first reference voltage at the detection time to detect the open-circuited states of the plurality of LED channels.

The apparatus may further include a power conversion controller for controlling the power converter according to the open-circuited states of the plurality of LED channels.

The power conversion controller may include a minimum value detector for detecting a minimum voltage among voltages of the second terminals of non-open-circuited LED channels based on the open-circuited states of the plurality of LED channels, an error amplifier for comparing the minimum voltage with a reference voltage to generate an error-amplified signal, and a comparator for comparing the error-amplified signal with a sawtooth wave signal to generate a control signal for the power converter.

According to another embodiment of the present invention, a method for driving an LED device having a plurality of LED channels is provided, and each LED channel has a plurality of LEDs connected in series. The method includes: controlling currents of the plurality of LED channels so that a state detection current flows in the plurality of LED channels; determining a detection time based on voltages of first terminals of the plurality of LED channels, wherein open-circuited states of the plurality of LED channels can be detected at a detection time; detecting the open-circuited states of the plurality of LED channels at the detection time based on voltages of the first terminals of the plurality of LED channels; and controlling currents of the plurality of LED channels so that an operation current flows in the plurality of LED channels.

The state detection current may be smaller than the operation current.

Determining the detection time may include determining, as the detection time, a time at which at least one of voltages of the first terminals of the plurality of LED channels is larger than a first reference voltage.

Detecting the open-circuited states of the plurality of LED channels may include comparing each of voltages of the first terminals of the plurality of LED channels with a second reference voltage at the detection time to detect the open-circuited states of the plurality of LED channels.

The second reference voltage may be smaller than the first reference voltage.

Determining the detection time may include determining, as the detection time, a time when a predetermined time elapses from a time at which at least one of voltages of the first terminals of the plurality of LED channels is larger than a first reference voltage.

Detecting the open-circuited states of the plurality of LED channels may include comparing each of voltages of the first terminals of the plurality of LED channels with the first reference voltage at the detection time to detect the open-circuited states of the plurality of LED channels.

The method may further include converting an input voltage into an output voltage based on the open-circuited states of the plurality of LED channels to provide the output voltage to the second terminals of the plurality of LED channels.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "connected" to another element, the element may be "directly connected" to the other element or "electrically connected" to the other element through a third element.

Figure 1:
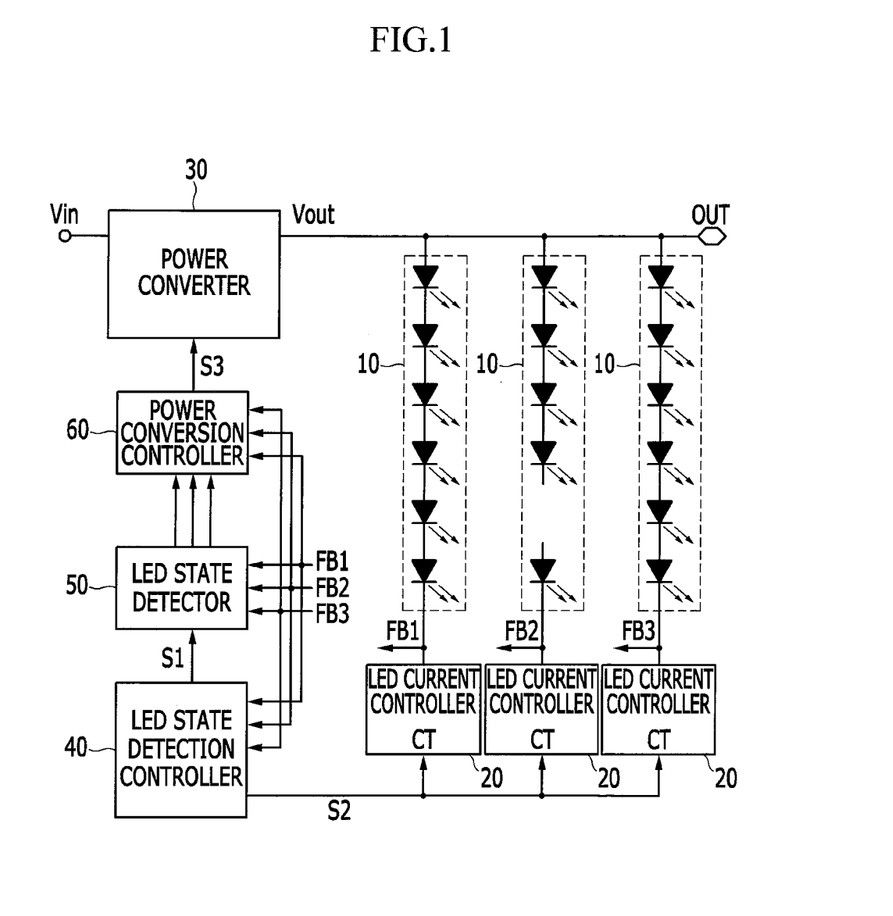
FIG. 1 is a schematic diagram of an LED device according to an exemplary embodiment of the present invention.

FIG. 1 is a schematic diagram of an LED device according to an exemplary embodiment of the present invention.

Referring to FIG. 1, the LED device includes a plurality of LED channels 10 and an LED driver. The LED driver includes a plurality of LED current controllers 20, a power converter 30, an LED state detection controller 40, an LED state detector 50, and a power conversion controller 60.

The plurality of LED channels 10 are connected in parallel between an output terminal OUT of the power converter 30 and a plurality of LED current controllers 20. Each LED channel 10 includes a plurality of LEDs that are connected in series. This LED channel 10 operates as a load of the LED driver. For better comprehension and ease of description, it is assumed that the LED device has three LED channels 10, but it is not necessary to limit as such.

The plurality of LED current controllers 20 are connected to the plurality of LED channels 10, respectively. Each LED current controller 20 has a control terminal CT. The LED current controller 20 controls a current of a corresponding LED channel 10 based on an LED current control signal S2 provided to the control terminal CT so that an LED state detection current or an LED operation current can flow in the corresponding LED channel 10. The LED operation current can vary according to an additional control signal, but the LED state detection current is set smaller than the LED operation current to minimize power consumption for LED state detection. For example, in a case that the LED operation current corresponds to 100 mA, the LED state detection current can correspond to 1 uA.

According to an exemplary embodiment of the present invention, in a case that the LED current control signal S2 has a high level, the LED current controller 20 controls a current of a corresponding LED channel 10 so that the LED state detection current can flow in the corresponding LED channel 10. Otherwise, in a case that the LED current control signal S2 has a low level, the LED current controller 20 controls a current of a corresponding LED channel 10 so that the LED operation current can flow in the corresponding LED channel 10. To guarantee time for LED state detection, when the LED current control signal S2 is changed from the high level to the low level, the LED current controller 20 controls a corresponding LED channel 10 so that the LED operation current can flow in the corresponding LED channel 10 after a short delay.

The power converter 30 converts an input voltage Vin into a voltage Vout suitable to driving of the plurality of LED channels 10 and outputs the voltage Vout to an output terminal OUT.

The LED state detection controller 40 outputs an LED state detection possibility instruction signal S1 and the LED current control signal S2 based on voltages FB1, FB2, and FB3 applied to the terminals of the plurality of LED channels 10.

The LED state detector 50 detects states of the plurality of LED channels 10 based on voltages FB1, FB2, and FB3 applied to the terminals of the plurality of LED channels 10.

The power conversion controller 60 determines whether to adjust the output voltage Vout of the power converter 30 based on voltages FB1, FB2, and FB3 applied to the terminals of the plurality of LED channels 10 and states of the plurality of LED channels 10, and outputs a power conversion control signal S3 to the power converter 30. The power converter 30 adjusts the output voltage Vout based on the power conversion control signal S3.

Next, referring to FIG. 2 to FIG. 5, the LED state detection controller 40 and the LED state detector 50 according to various exemplary embodiments of the present invention will be described.

Figure 2:
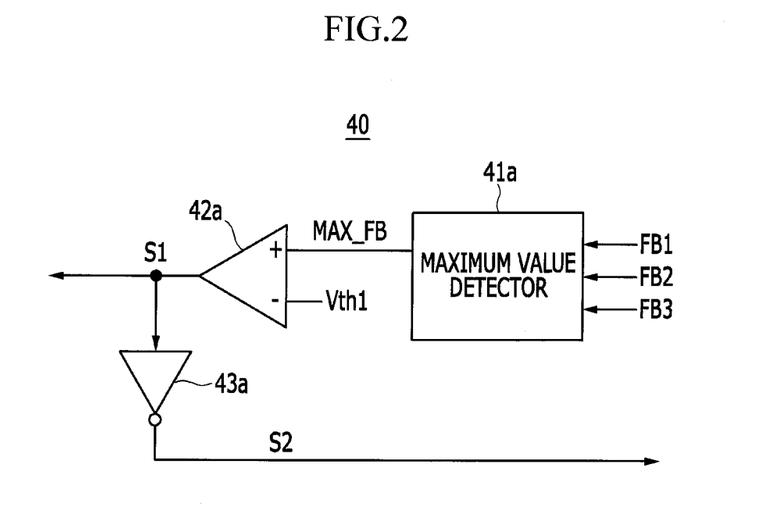
FIG. 2 is a schematic diagram of an LED state detection controller according to an exemplary embodiment of the present invention.

FIG. 2 is a schematic diagram of an LED state detection controller according to an exemplary embodiment of the present invention.

Referring to FIG. 2, the LED state detection controller 40 an exemplary embodiment of the present invention includes a maximum value detector 41a, a comparator 42a, and a NOT gate 43a.

The maximum value detector 41a outputs a maximum voltage MAX_FB among voltages FB1, FB2, and FB3 applied to the terminals of the plurality of LED channels 10.

The comparator 42a compares the maximum voltage MAX_FB outputted from the maximum value detector 41a with a reference voltage Vth1. If the maximum voltage MAX_FB is smaller than the reference voltage Vth1, the comparator 42a outputs the LED state detection possibility instruction signal S1 with a low level. Otherwise, if the maximum voltage MAX_FB is larger than the reference voltage Vth1, the comparator 42a outputs the LED state detection possibility instruction signal S1 with a high level. The LED state detection possibility instruction signal S1 with the low level represents that LED state detection is impossible, and the LED state detection possibility instruction signal S1 with the high level represents that LED state detection is possible. The reference voltage Vth1 can be determined so that a current can flow in all non-open-circuited LED channels 10 when the maximum voltage MAX_FB reaches the reference voltage Vth1.

The NOT gate 43a inverts a level of the LED state detection possibility instruction signal S1 to output the LED current control signal S2.

Figure 3:
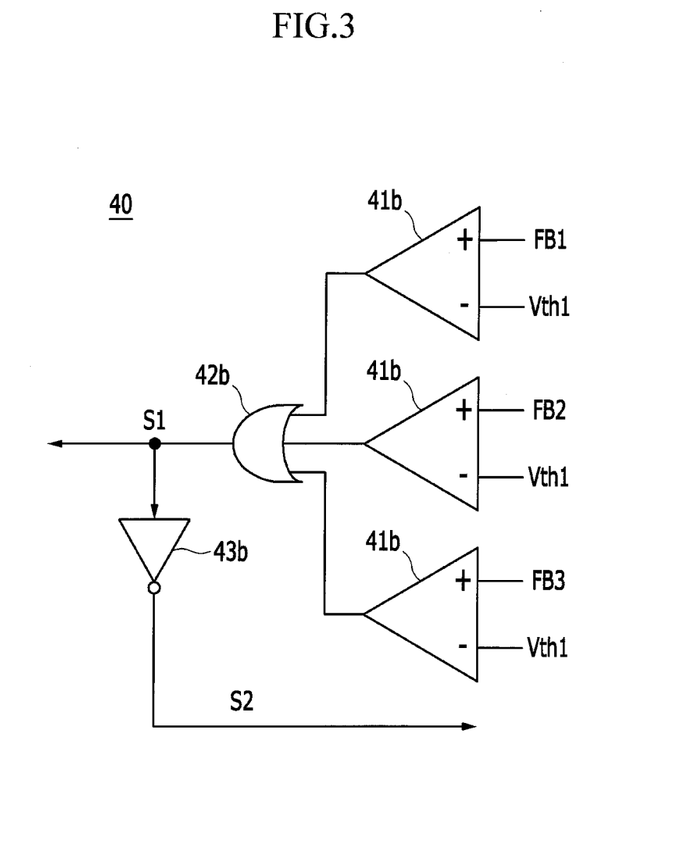
FIG. 3 is a schematic diagram of an LED state detection controller according to another exemplary embodiment of the present invention.

FIG. 3 is a schematic diagram of an LED state detection controller according to another exemplary embodiment of the present invention.

Referring to FIG. 3, the LED state detection controller 40 according to another exemplary embodiment of the present invention includes a plurality of comparators 41b, an OR gate 42b, and a NOT gate 43b.

The plurality of comparators 41b correspond to the plurality of LED channels 10, respectively. Each comparator 41b has a non-inverted terminal (+) applied to a voltage of a terminal of a corresponding LED channel 10, and an inverted terminal (−) applied to the reference voltage Vth1. If the voltage applied to the non-inverted terminal (+) is smaller than the reference voltage Vth1, the comparator 41b outputs a signal with the low level. Otherwise, if the voltage applied to the non-inverted terminal (+) is larger than the reference voltage Vth1, the comparator 41b outputs a signal with the high level.

The OR gate 42b performs an OR operation with output signals of the plurality of comparators 41b as inputs to output the LED state detection possibility instruction signal S1.

The NOT gate 43b inverts a level of the LED state detection possibility instruction signal S1 to output the LED current control signal S2.

Figure 4:
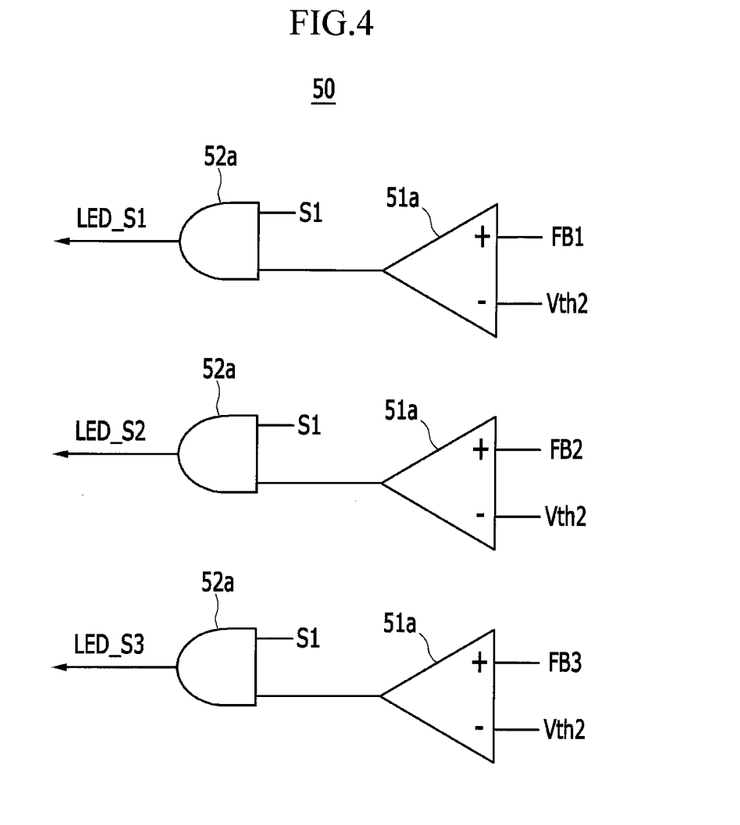
FIG. 4 is a schematic diagram of an LED state detector according to an exemplary embodiment of the present invention.

FIG. 4 is a schematic diagram of an LED state detector according to an exemplary embodiment of the present invention.

Referring to FIG. 4, the LED state detector 50 according to an exemplary embodiment of the present invention includes a plurality of comparators 51a and a plurality of AND gates 52a.

The plurality of comparators 51a correspond to the plurality of LED channels 10, respectively. Each comparator 51a has a non-inverted terminal (+) applied to a voltage of a terminal of a corresponding LED channel 10, and an inverted terminal (−) applied to a reference voltage Vth2. If a voltage applied to the non-inverted terminal (+) is smaller than the reference voltage Vth2, the comparator 41b outputs a signal with the low level. Otherwise, if a voltage applied to the non-inverted terminal (+) is larger than the reference voltage Vth2, the comparator 41b outputs a signal with the high level. Because the reference voltage Vth2 is for detecting the open-circuited LED channel and 0V is applied to a terminal of the open-circuited LED channel, the reference voltage Vth2 is determined as a voltage that is smaller than the reference voltage Vth1 and is larger than 0V.

The plurality of AND gates 52a correspond to the plurality of LED channels 10, respectively. Each AND gate 52a performs an AND operation with an output signal of a corresponding comparator 51a and the LED state detection possibility instruction signal S1 as inputs, and outputs an LED channel state signal of a corresponding LED channel 10. In an exemplary embodiment of the present invention, in a case that the LED state detection possibility instruction signal S1 has the high level, the LED channel state signal with the low level represents that a corresponding LED channel 10 is open-circuited, and the LED channel state signal with the high level represents that the corresponding LED channel 10 is not open-circuited.

Figure 5:
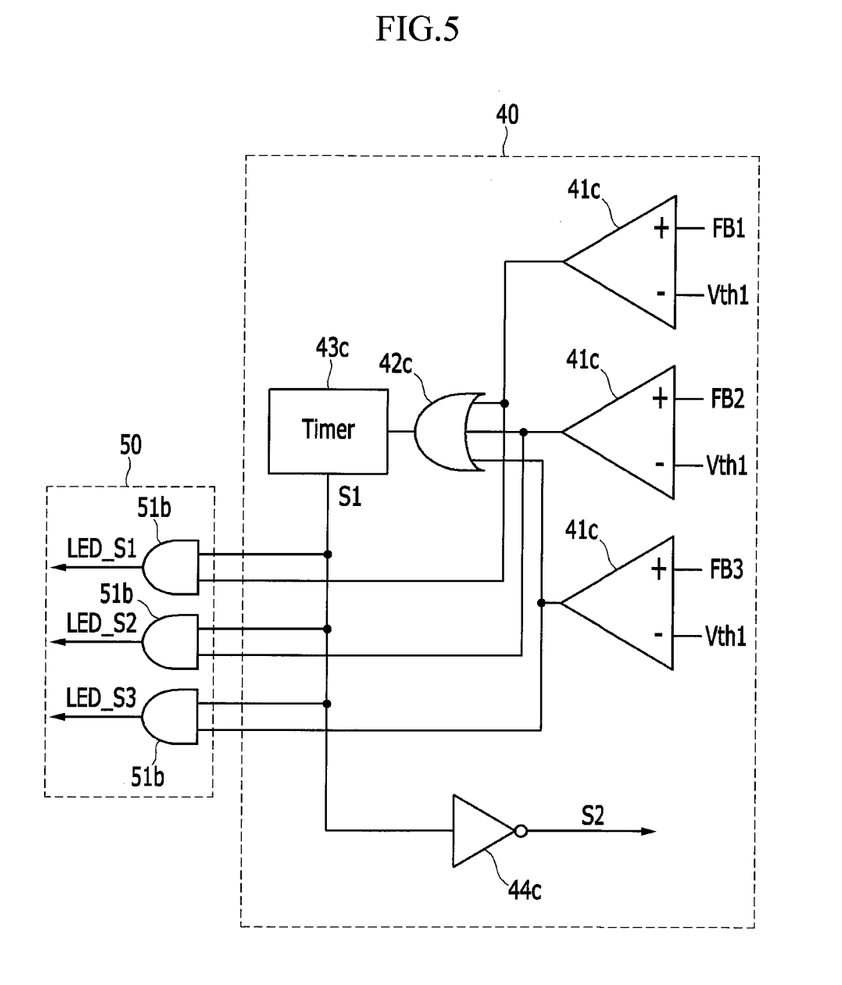
FIG. 5 is a schematic diagram of an LED state detection controller and an LED state detector according to another exemplary embodiment of the present invention.

FIG. 5 is a schematic diagram of an LED state detection controller and an LED state detector according to another exemplary embodiment of the present invention.

Referring to FIG. 5, the LED state detection controller 40 according to an exemplary embodiment of the present invention includes a plurality of comparators 41c, an OR gate 42c, a timer 43c, and a NOT gate 44c. The LED state detector 50 according to an exemplary embodiment of the present invention includes a plurality of AND gates 51b.

The plurality of comparators 41c correspond to the plurality of LED channels 10, respectively. Each comparator 41c has a non-inverted terminal (+) applied to a voltage of a terminal of a corresponding LED channel 10, and an inverted terminal (−) applied to the reference voltage Vth1. If a voltage applied to the non-inverted terminal (+) is smaller than the reference voltage Vth1, the comparator 41c outputs a signal with the low level. Otherwise, if a voltage applied to the non-inverted terminal (+) is larger than the reference voltage Vth1, the comparator 41c outputs a signal with the high level.

The OR gate 42c performs an OR operation with output signals of the plurality of comparators 41c as inputs.

If a timer expiration time elapses from a rising edge of an output signal of the OR gate 42c while the timer 43c outputs the LED state detection possibility instruction signal S1 with the low level, the timer 43c outputs the LED state detection possibility instruction signal S1 with the high level. The timer expiration time can be determined so that a current can flow in all non-open-circuited LED channels 10 when the timer expiration time elapses from the rising edge of the output signal of the OR gate 42c.

The NOT gate 44c inverts a level of the LED state detection possibility instruction signal S1 to output the LED current control signal S2.

The plurality of AND gates 51b correspond to the plurality of LED channels 10, respectively. Each AND gate 51b performs an AND operation with an output signal of a corresponding comparator 41c and the LED state detection possibility instruction signal S1 as inputs, and outputs the LED channel state signal of a corresponding LED channel 10.

Next, referring to FIG. 6, the power conversion controller 60 and the power converter 30 according to an exemplary embodiment of the present invention will be described.

Figure 6:
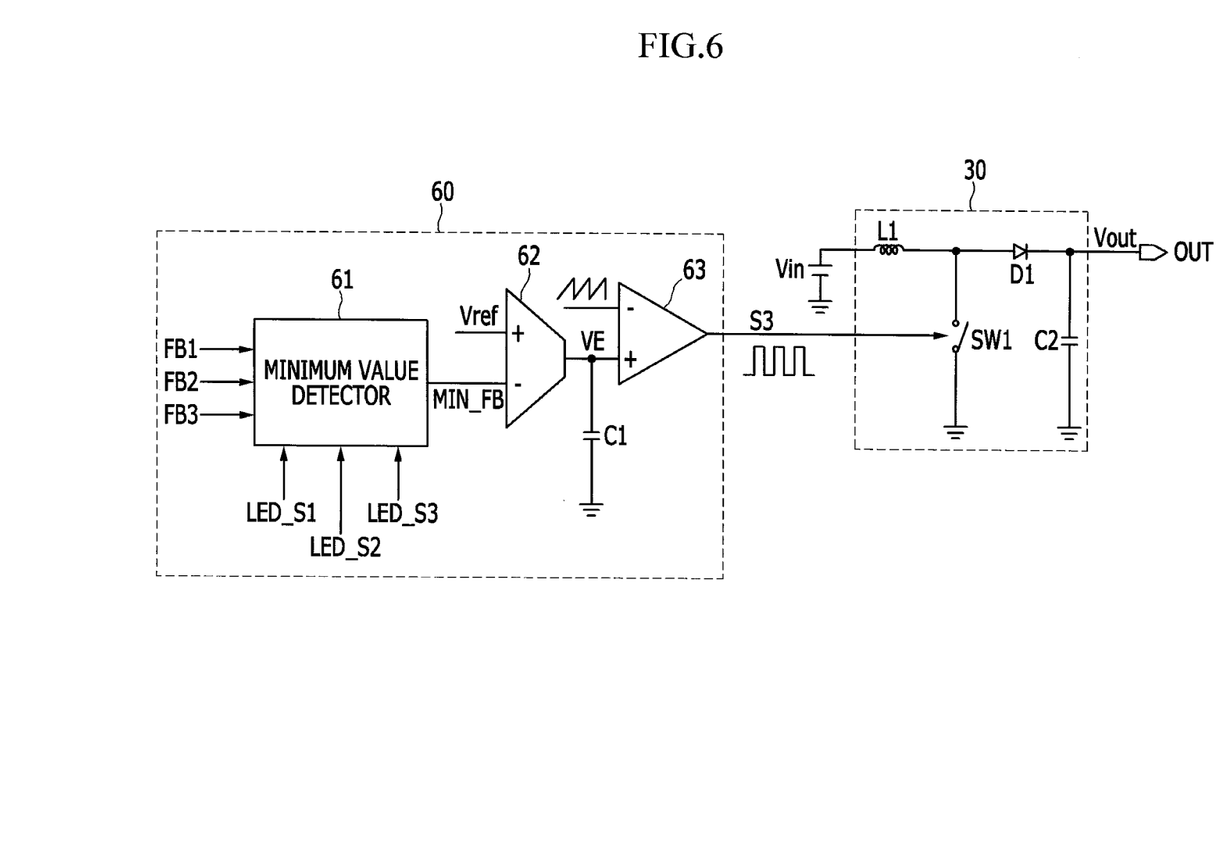
FIG. 6 is a schematic diagram of a power conversion controller and a power converter according to an exemplary embodiment of the present invention.

FIG. 6 is a schematic diagram of a power conversion controller and a power converter according to an exemplary embodiment of the present invention.

Referring to FIG. 6, the power conversion controller 60 according to an exemplary embodiment of the present invention includes a minimum value detector 61, an error amplifier 62, a capacitor C1, and a comparator 63.

The minimum value detector 61 outputs a minimum voltage MIN_FB among voltages of terminals of non-open-circuited LED channels based on the LED channel state signals LED_S1, LED_S2, and LED_S3.

The error amplifier 62 compares a reference voltage Vref with the minimum voltage MIN_FB to generate an error-amplified signal VE. The capacitor C1 is connected to an output terminal of the error amplifier 62, so a noise of the error-amplified signal VE is removed. The error amplifier 62 has an inverted terminal (−) provided with the minimum voltage MIN_FB, and a non-inverted terminal (+) provided with the reference voltage Vref. The error amplifier 62 amplifies the reference voltage Vref subtracted by the minimum voltage MIN_FB with a predetermined gain to generate the error-amplified signal VE.

The comparator 63 compares the error-amplified signal VE with a sawtooth wave signal to output the power conversion control signal S3 corresponding to a pulse width modulation (PWM) signal.

The boost converter can be used among DC-DC converters as an example of the power converter 30. Concretely, the power converter 30 includes a switch SW1, an inductor L1, a diode D1, and a capacitor C2.

One terminal of the inductor L1 is connected to the input voltage Vin, and the other terminal of the inductor L1 is connected to both an anode of the diode D1 and one terminal of the switch SW1. A cathode of the diode D1 is connected to one terminal of the capacitor C2. Both the other terminal of the capacitor C1 and the other terminal of the switch SW1 are connected to a ground terminal. At this time, a voltage of the capacitor C2 becomes the output voltage Vout.

The switch SW1 is controlled by the power conversion control signal S3. If the switch SW1 is turned on, a current flows from the input voltage Vin to the ground terminal through the inductor L1 and the switch SW1, so a current in the inductor L1 increases. Next, if the switch SW1 is turned off, the capacitor C1 is charged by the current of the inductor L1, so the input voltage Vin is converted into the output voltage Vout. At this time, the output voltage Vout is determined by a duty ratio of the power conversion control signal S3.

Next, referring to FIG. 7, a driving method of the LED device according to an exemplary embodiment of the present invention will be described.

Figure 7:
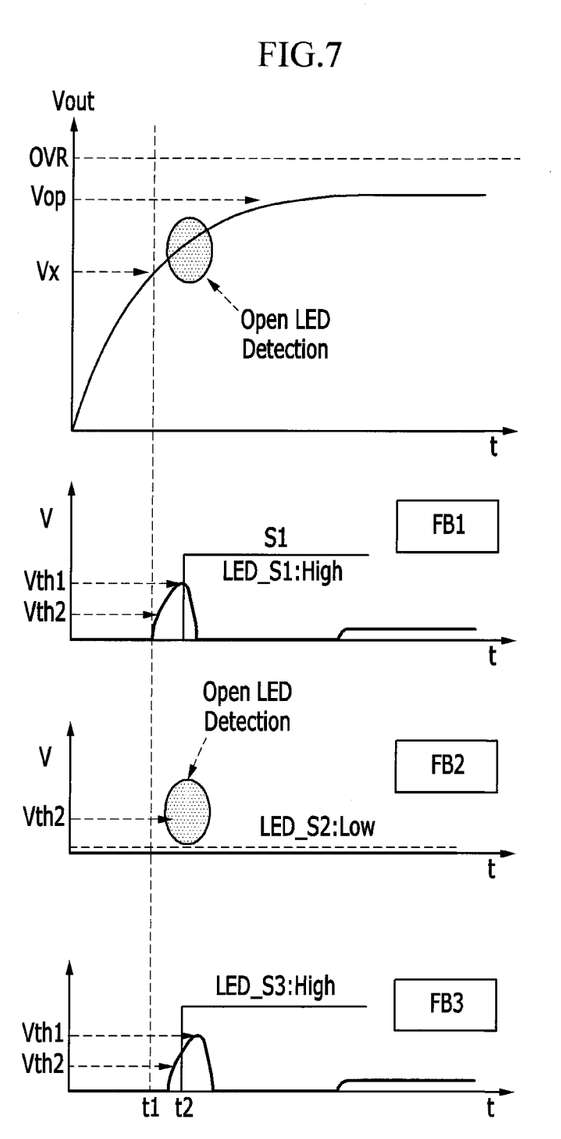
FIG. 7 is a waveform diagram representing an output voltage of the power converter and voltages applied to terminals of the LED channels.

FIG. 7 is a waveform diagram representing an output voltage of the power converter and voltages applied to terminals of the LED channels.

In particular, in connection with FIG. 7, assume that the LED device includes a first LED channel, a second LED channel, and a third LED channel, the second LED channel corresponds to an open-circuited channel, and a threshold voltage Vx of the first LED channel is smaller than a threshold voltage of the third LED channel.

Because the LED current control signal S2 has the high level immediately after the LED device is turned on, each of the plurality of LED current controllers 20 controls a current of a corresponding LED channel 10 so that the LED state detection current flows in the corresponding LED channel 10.

Before the output voltage Vout of the power converter 30 reaches the threshold voltage Vx of the first LED channel, all voltages FB1, FB2, and FB3 applied to terminals of the plurality of LED channels 10 are 0V.

After the output voltage Vout of the power converter 30 reaches the threshold voltage Vx of the first LED channel at time t1, the voltage FB1 applied to a terminal of the first LED channel also increases.

When the voltage FB1 applied to the terminal of the first LED channel reaches the reference voltage Vth1 at time t2, the LED state detection controller 40 outputs the LED state detection possibility instruction signal S1 with the high level.

In connection with FIG. 4, at time t2 when the voltage FB1 applied to the terminal of the first LED channel is larger than the reference voltage Vth1, the voltage FB1 applied to the terminal the first LED channel is also larger than the reference voltage Vth2, so the LED state detector 50 outputs the first LED channel state signal LED_S1 with the high level representing that the first LED channel corresponds to a non-open-circuited channel. In the other hand, because the second LED channel corresponds to the open-circuited channel, the voltage FB2 applied to a terminal of the second LED channel is continually 0V at time t2 when the voltage FB1 applied to the terminal of the first LED channel is larger than the reference voltage Vth1. Therefore, the LED state detector 50 outputs the second LED channel state signal LED_S2 with the low level representing that the second LED channel corresponds to the open-circuited channel. The threshold voltage of the third LED channel is larger than the threshold voltage Vx of the first LED channel, but the voltage FB3 applied to the terminal of the third LED channel is smaller than the reference voltage Vth1 and is larger than the reference voltage Vth2 at time t2 when the voltage FB1 applied to the terminal of the first LED channel is larger than the reference voltage Vth1. Therefore, the LED state detector 50 outputs the third LED channel state signal LED_S3 with the high level representing that the third LED channel corresponds to the open-circuited channel.

Because the power conversion controller 60 can generate the power conversion control signal S3 by using LED channel state signals LED_S1, LED_S2, and LED_S3 of the plurality of LED channels, even if the power converter 30 does not output a minimum output voltage OVR, the LED driver can find the open-circuited LED channel before the power converter 30 outputs an output voltage corresponding to an LED operation voltage Vop.

On the other hand, if a level of the LED state detection possibility instruction signal S1 becomes high, a level of the LED current control signal S2 becomes low, so each of the plurality of LED current controllers 20 controls a current of a corresponding LED channel 10 so that the LED operation current can flow in the corresponding LED channel 10. With this, the voltage FB1 applied to the terminal of the first LED channel and the voltage FB3 applied to the terminal of the third LED channel temporarily have a voltage level close to 0V. And, the voltage FB1 and the voltage FB3 have a certain voltage level after the LED driver is stabilized.

According to aspects of embodiments of the present invention, the open-circuited LED channel can be detected before the output voltage reaches the LED operating voltage, so the power consumption and heat generation can be reduced.

The exemplary embodiments of the present invention are not implemented only by a device and/or method, but can be implemented through a program for realizing functions corresponding to the configuration of the exemplary embodiments of the present invention and a recording medium having the program recorded thereon. These implementations can be realized by the ordinarily skilled person in the art from the description of the above-described exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for driving a light emitting diode (LED) device having a plurality of LED channels, each LED channel having a plurality of LEDs connected in series, the apparatus comprising:
a power converter for converting an input voltage into an output voltage to output the output voltage to an output terminal, the output terminal connected to first terminals of the plurality of LED channels;
a plurality of current controllers connected to second terminals of the plurality of LED channels, respectively, each current controller controlling a current of a corresponding LED channel;
a detection controller for determining a detection time based on voltages of the second terminals of the plurality of LED channels, wherein open-circuited states of the plurality of LED channels can be detected at the detection time; and
a state detector for detecting the open-circuited states of the plurality of LED channels based on voltages of the second terminals of the plurality of LED channels at the detection time.

2. The apparatus of claim 1, wherein each current controller controls before the detection time so that a state detection current flows in the corresponding LED channel, and controls after the detection time so that an operation current flows in the corresponding LED channel.

3. The apparatus of claim 2, wherein the state detection current is smaller than the operation current.

4. The apparatus of claim 1, wherein the detection controller determines, as the detection time, a time when a predetermined time elapses from a time at which at least one of voltages of the second terminals of the plurality of LED channels is larger than the first reference voltage.

5. The apparatus of claim 4, wherein the state detector compares each of voltages of the second terminals of the plurality of LED channels with the first reference voltage at the detection time to detect the open-circuited states of the plurality of LED channels.

6. The apparatus of claim 1, further comprising a power conversion controller for controlling the power converter according to the open-circuited states of the plurality of LED channels.

7. The apparatus of claim 6, wherein the power conversion controller comprises:
a minimum value detector for detecting a minimum voltage among voltages of the second terminals of non-open-circuited LED channels based on the open-circuited states of the plurality of LED channels;
an error amplifier for comparing the minimum voltage with a reference voltage to generate an error-amplified signal; and
a comparator for comparing the error-amplified signal with a sawtooth wave signal to generate a control signal for the power converter.

8. The apparatus of claim 1, wherein the detection controller determines, as the detection time, a time at which at least one of voltages of the second terminals of the plurality of LED channels is larger than a first reference voltage.

9. The apparatus of claim 8, wherein the state detector compares each of voltages of the second terminals of the plurality of LED channels with a second reference voltage at the detection time to detect the open-circuited states of the plurality of LED channels.

10. The apparatus of claim 9, wherein the second reference voltage is smaller than the first reference voltage.

11. The apparatus of claim 8, wherein the detection controller comprises:
a maximum value detector for detecting a maximum voltage among voltages of the second terminals of the plurality of LED channels; and
a comparator for comparing the maximum voltage and the first reference voltage to generate a signal representing the detection time.

12. The apparatus of claim 8, wherein the detection controller comprises:
a plurality of comparators corresponding to the plurality of LED channels, each comparator comparing a voltage of the second terminal of a corresponding LED channel with the first reference voltage; and
an AND gate for performing an AND operation with output signals of the plurality of comparators as inputs to generate a signal representing the detection time.

13. A method for driving a light emitting diode (LED) device having a plurality of LED channels, each LED channel having a plurality of LEDs connected in series, the method comprising:
controlling currents of the plurality of LED channels so that a state detection current flows in the plurality of LED channels;
determining a detection time based on voltages of first terminals of the plurality of LED channels, wherein open-circuited states of the plurality of LED channels can be detected at the detection time;
detecting the open-circuited states of the plurality of LED channels at the detection time based on voltages of the first terminals of the plurality of LED channels; and
controlling currents of the plurality of LED channels so that an operation current flows in the plurality of LED channels.

14. The method of claim 13, wherein the state detection current is smaller than the operation current.

15. The method of claim 13, further comprising converting an input voltage into an output voltage based on the open-circuited states of the plurality of LED channels to provide the output voltage to the second terminals of the plurality of LED channels.

16. The method of claim 13, wherein determining the detection time comprises determining, as the detection time, a time at which at least one of voltages of the first terminals of the plurality of LED channels is larger than a first reference voltage.

17. The method of claim 16, wherein detecting the open-circuited states of the plurality of LED channels comprises comparing each of voltages of the first terminals of the plurality of LED channels with a second reference voltage at the detection time to detect the open-circuited states of the plurality of LED channels.

18. The method of claim 17, wherein the second reference voltage is smaller than the first reference voltage.

19. The method of claim 13, wherein determining the detection time comprises determining, as the detection time, a time when a predetermined time elapses from a time at which at least one of voltages of the first terminals of the plurality of LED channels is larger than a first reference voltage.

20. The method of claim 19, wherein detecting the open-circuited states of the plurality of LED channels comprises comparing each of voltages of the first terminals of the plurality of LED channels with the first reference voltage at the detection time to detect the open-circuited states of the plurality of LED channels.

* * * * *